No. 871,878. PATENTED NOV. 26, 1907.
W. W. MARSH.
LINER FOR CENTRIFUGAL CREAM SEPARATORS.
APPLICATION FILED APR. 8, 1907.

WITNESSES:

INVENTOR
Wilbur W. Marsh,
BY
ATTORNEY

UNITED STATES PATENT OFFICE.

WILBUR W. MARSH, OF WATERLOO, IOWA.

LINER FOR CENTRIFUGAL CREAM-SEPARATORS.

No. 871,878.     Specification of Letters Patent.     Patented Nov. 26, 1907.

Application filed April 8, 1907. Serial No. 367,015.

*To all whom it may concern:*

Be it known that I, WILBUR W. MARSH, a citizen of the United States of America, and a resident of Waterloo, Blackhawk county, Iowa, have invented certain new and useful Improvements in Liners for Centrifugal Cream-Separators, of which the following is a specification.

My invention relates to centrifugal cream separators, and the object of my improvements is to provide a liner capable of dividing the space between the cream zone and the inner periphery of the bowl into concentric zones, and whose laminæ separate such zones into a plurality of communicating interspaces, so arranged that each interspace within the inner zone is wider between laminæ than is the interspace in the outer zone with which it is in communication. This object I have accomplished by the means which are hereinafter described and claimed, and which is illustrated in the accompanying drawings, in which—

Figure 1:
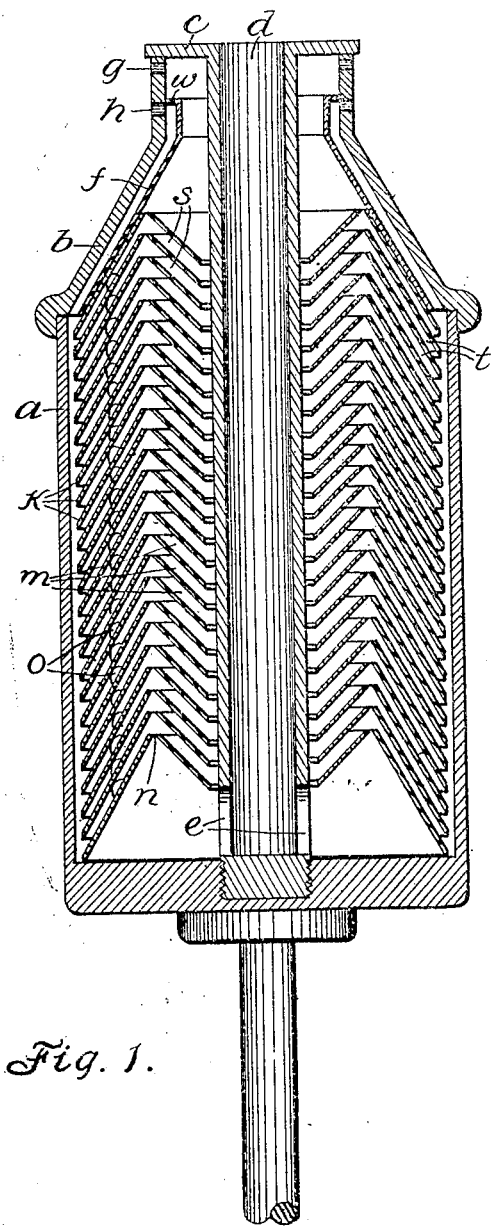
Figure 2:
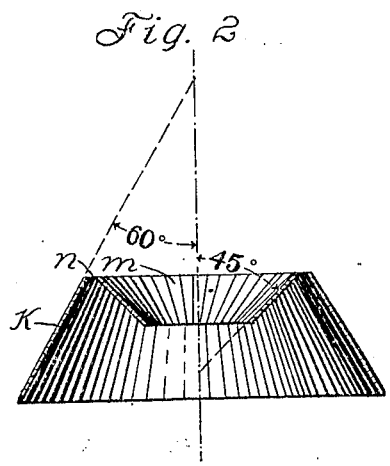
Figure 3:
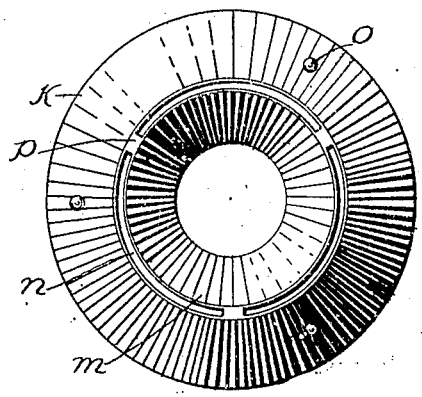

Figure 1 is a central vertical axial section of a separator bowl containing my improved liner, Fig. 2 is a central vertical axial section of one of the laminal disks of the said liner, and Fig. 3 is a plan view of said disk.

Similar letters of reference refer to similar parts throughout the several views.

I have shown in Fig. 1 a separator bowl *a* of a well known type, having a cover *b* secured thereon by means of a hollow clamping bolt *c*, whose lower end is threaded to enter an interiorly threaded opening in the bottom of said bowl. The upper lip or fillet of the clamping bolt *c* contacts with the hollow neck of the conical cover *b* to hold it in place against the bowl when said bowl is screwed down into place. Said bolt has an axial opening *d* forming an inlet tube for milk entering to be separated, exits *e* being provided at the lower end of said bolt to afford communication between the inlet and the interior of the bowl near its bottom. The neck of the cover *b* has cream exits *g* and skimmed-milk exits *h*, while an inner cone *f* is removably set within and spaced away from the inside of said cover, its lower edge approaching the inner periphery of the bowl to afford an exit therebetween for the skimmed milk issuing from the liner. The upper end or neck of the inner cone *f* has a fillet *w* which contacts with the inner periphery of the neck of said cover between the cream exits *g* and the skimmed-milk exits *h*.

The space between the inner periphery of the bowl and the cream zone near its axis, is filled with a vertical series of superposed laminæ or separating devices, spaced apart, arranged as depicted in Fig. 1. Each separating device comprises an outer and an inner disk in the form of truncated hollow cones, arranged reversely with respect to each other, and connected by supporting strips *p*, openings *n* being provided between said disks to permit the passage therethrough of the current of ascending separating milk. As shown, the outer disks *k* are directed downward at an angle of 60 degrees with the axis of the bowl, while the inner disks *m* are directed upward at an angle of 45 degrees with said axis.

It will be observed that when such separating devices are superposed, and spaced apart by means of raised studs *o* thereon, the interspaces *s* between the inner zone of disks *m* are wider than are the interspaces *t* between the disks *k* of the outer zone of the bowl. It is not material, however, whether the angles of inclination of the said disks *k* and *m* are the same as those shown toward the axis of the bowl, provided that the particular angles adopted for the inner and outer disks of each separating device are different, and that the greater angle is used in the inner series of disks. This mode of arrangement causes the interspaces *s* to exceed the interspaces *t* in width.

When milk is sprayed into the interior of the bowl through the exits *e*, an ascending current sets in, and separation progresses, the cream seeking the cream zone, while the skimmed milk approaches the inner periphery of the bowl. As the separating milk passes upward through the arc-shaped openings *n* in the vertices of the two-part separating laminæ *km*, the larger portion of the cream separates in the wide interspaces *s* of the inner disks *m* and flows comparatively unobstructed to the cream zone between the inner edges of said disks and the clamping-bolt *c*, said cream then moving upward and escaping from the bowl through the cream-exits *g*. The partially skimmed milk, through the influence of centrifugal force, moves outward through the narrow interspaces *t*, finding considerably more frictional surface interposed by means of the disks *k*, and being sufficiently retarded to allow the minuter particles of cream to collect along such surfaces and flow toward the cream zone. The outer zone of laminæ *k* being thus more closely spaced apart, more thoroughly strips the partially skimmed milk, and the skimmed milk then escapes along the interior periphery of the bowl and between the cover and cone $f$ through the exits $h$. More effectual skimming is thus done in the outer zone of the bowl, where the separation is most difficult, and freer movement permitted the cream in the inner zone, where but little in the way of obstructing or collecting surface is naturally necessary.

As all the full milk ascends through the upwardly communicating openings $n$ which are in the neutral zone of the bowl and so arranged with respect to each other as to provide a nearly uninterrupted channel no matter how the dividing laminæ or inverted frusta $km$ are superposed, the cream in the cream zone about the exterior periphery of the inlet-tube $d$ is undisturbed by such current of rising full milk. The cream as it separates is free to move inwardly over the inverted frusta $m$ to such cream zone. The connections $p$ between the arc-shaped openings $n$ are so narrow as to not interrupt the ascending current of the full milk through such openings, even if the openings do not register in the ascending series. The length of the said openings and their free delivery into each other as aforesaid, prevents their becoming clogged with cream when the temperature has fallen through a certain number of degrees, but the full milk passing through said openings will by its current scour the edges thereof and keep the access free.

Having described my invention, what I claim as new, and desire to secure by Letters-Patent of the United States, is—

1. A liner for a centrifugal cream separator, composed of a vertical series of superposed inner and outer concentric hollow frusta, each inner frustum being inverted with respect to its outer concentric frustum, and each inner frustum being connected by narrow bands or connections to its outer concentric frustum whereby a nearly uninterrupted cylindrical concentric channel is provided between the entire series of inner and outer frusta located in the neutral zone of the bowl.

2. A liner for a centrifugal cream separator, composed of a vertical series of superposed inner and outer concentric hollow frusta, each inner frustum being inverted with respect to its outer concentric frustum, and each inner frustum being connected by narrow bands or connections to its outer concentric frustum whereby a nearly uninterrupted cylindrical concentric channel is provided between the entire series of inner and outer frusta located in the neutral zone of the bowl, each inner and its outer connected frustum being separable from the frusta above and below them.

3. A liner for a centrifugal cream separator, composed of a vertical series of superposed inner and outer concentric hollow frusta, each inner frustum being inverted with respect to its outer concentric frustum, and each inner frustum being connected by narrow bands or connections to its outer concentric frustum whereby a nearly uninterrupted cylindrical concentric channel is provided between the entire series of inner and outer frusta located in the neutral zone of the bowl, each inner and its outer connected frustum being separable from the frusta above and below them, and the outer frusta being arranged with respect to each other and the inner frusta so that the interspace between said outer frusta are of less height than are the interspaces between the inner frusta.

4. A liner for a centrifugal cream separator, composed of a vertical series of superposed inner and outer concentric hollow frusta, each inner frustum being inverted with respect to its outer concentric frustum, and the abutting edges of such concentric frusta being joined by narrow connections so as to provide relatively long arc-shaped openings between such edges.

5. A liner for a centrifugal cream separator, composed of a vertical series of superposed inner and outer concentric hollow frusta, each inner frustum being inverted with respect to its outer concentric frustum, the abutting edges of such concentric frusta being joined by narrow connections so as to provide relatively long arc-shaped openings between such edges, such openings being located in the neutral zone of the bowl, and the outer frusta being arranged so as to be spaced a less distance apart than the inner frusta are spaced apart.

Signed at Waterloo, Iowa, this 26th day of Mch. 1907.

WILBUR W. MARSH.

Witnesses:
G. C. KENNEDY,
M. E. KENNEDY.